United States Patent [19]
Osojnak

[11] 3,972,234
[45] Aug. 3, 1976

[54] LIQUID LEVEL INDICATOR

[76] Inventor: Boris M. Osojnak, 4582 Arcata Road, Salt Lake City, Utah 84117

[22] Filed: Dec. 30, 1974

[21] Appl. No.: 537,366

[52] U.S. Cl. ............................... 73/303; 73/419; 116/114 PV
[51] Int. Cl.² ..................... G01F 23/00; G01L 7/16
[58] Field of Search ............ 73/302, 303, 419, 439; 92/159, 5 R; 277/190; 116/114 PV

[56] References Cited
UNITED STATES PATENTS

| | | | |
|---|---|---|---|
| 1,539,407 | 5/1925 | Phelps | 73/303 |
| 1,711,507 | 5/1929 | Titterington | 73/302 |
| 1,758,077 | 5/1930 | Fentress | 73/302 |
| 2,642,743 | 6/1953 | Hermanny | 73/302 X |
| 2,840,035 | 6/1958 | La Porte | 73/303 X |
| 3,062,600 | 11/1962 | Zehner | 92/159 X |
| 3,722,896 | 3/1973 | Tankus | 277/190 X |
| 3,769,880 | 11/1973 | Mirjanic | 92/169 |
| 3,834,236 | 9/1974 | Durin | 73/302 |

*Primary Examiner*—Richard C. Queisser
*Assistant Examiner*—John S. Appleman
*Attorney, Agent, or Firm*—Lon H. Romanski

[57] ABSTRACT

A liquid level indicator as applied to an internal combustion engine, having a crankcase forming an oil reservoir therein, has conduit means extending downwardly generally into the reservoir with a lower open end of said conduit means being positioned at an elevation corresponding to a preselected minimum level of such oil within the reservoir. A cylinder chamber, connected to the other end of the conduit means, contains a manually depressable plunger-like piston which is resiliently urged in a first direction. When the piston plunger is fully depressed in a second direction (opposite to the first direction) the air within the cylinder chamber is displaced through the conduit means. Upon subsequent release of piston plunger, an associated spring urges the piston plunger in the first direction creating a reduced atmospheric pressure within the cylinder chamber. If the level of the oil in the reservoir is above the open end of the conduit means, oil will flow upwardly into the conduit means, until an equilibrium is attained when its pressure head equals the difference between ambient atmospheric pressure and the reduced atmospheric pressure. When such equilibrium is attained, the further movement, in the first direction, of said piston plunger is stopped with the result that such stopping occurs prior to the piston plunger fully returning to its original position. If the level of the oil is below the open end of the conduit means, the piston plunger, when released, will fully return to its original position. The difference between which of such positions the piston plunger returns to, when released, is employed as an indication of whether the level of oil is sufficient.

16 Claims, 5 Drawing Figures

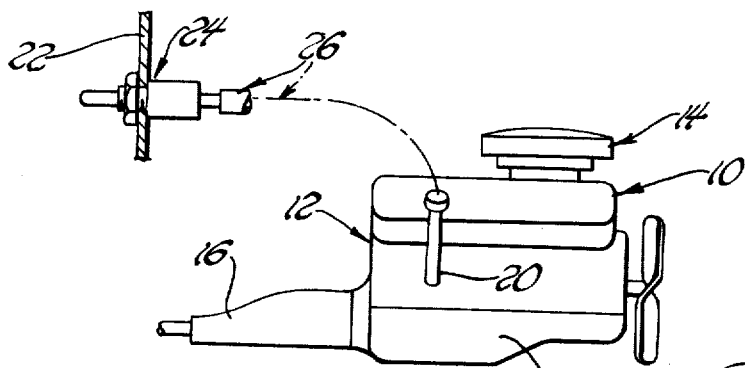
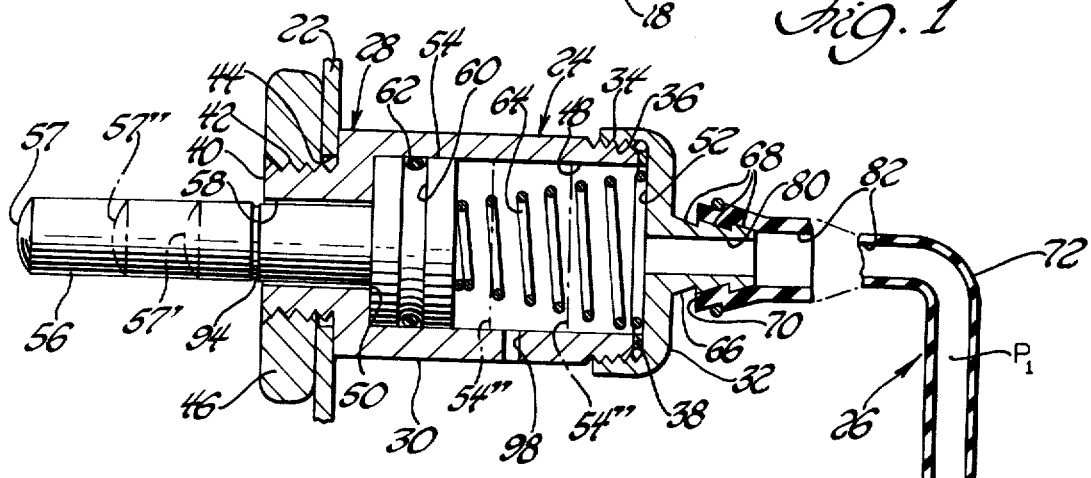
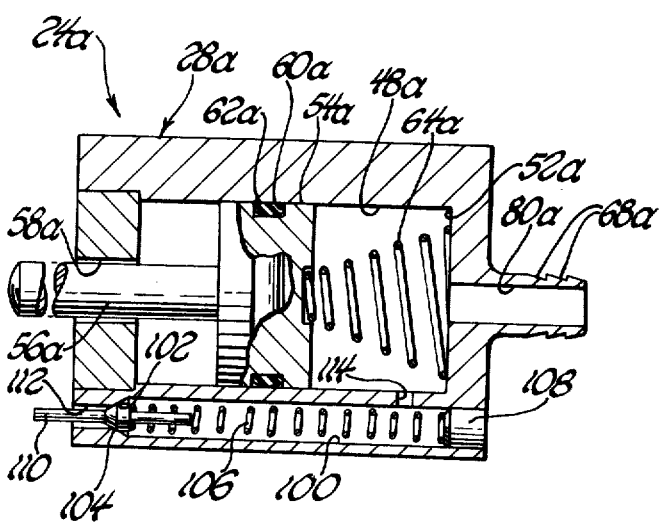
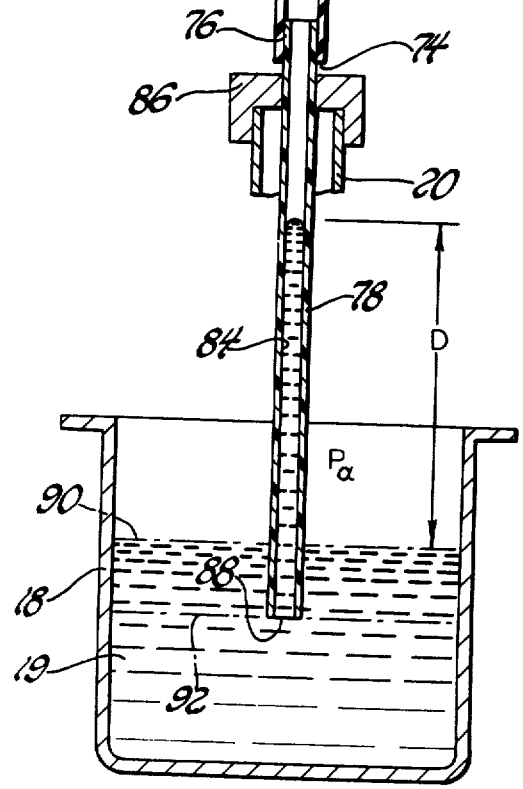
Fig. 1
Fig. 2
Fig. 3

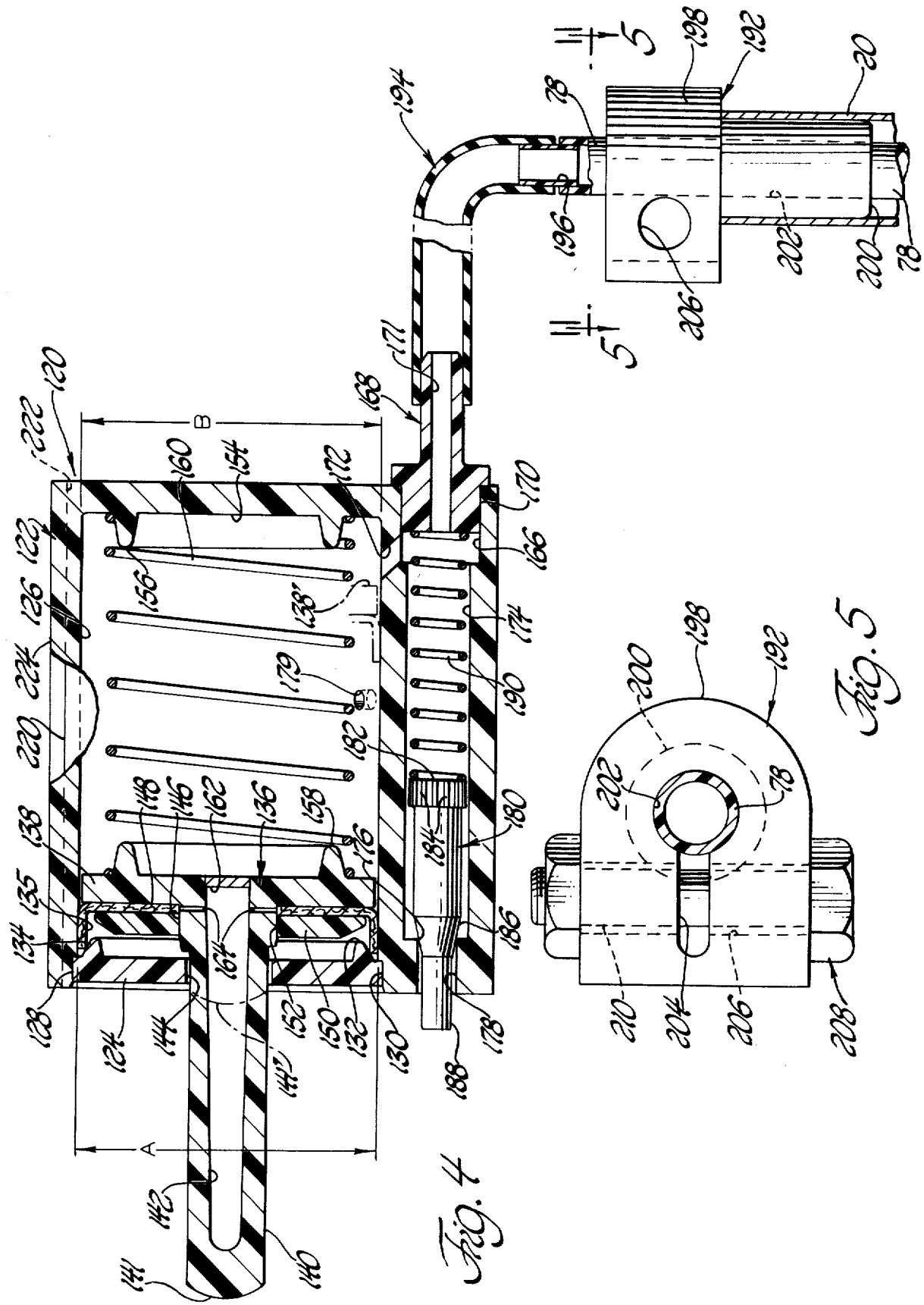

LIQUID LEVEL INDICATOR

BACKGROUND OF THE INVENTION

All forms of automotive vehicles, such as, for example, automobiles, trucks, tractors and the like, have heretofore been provided with gauging means associated with the engine oil supply or reservoir. Such prior art gauging means has taken the form of pressure gauge systems which indicate to the vehicle operator whether the engine oil pressure is sufficiently high. Generally, the industry, for the most part, has, in the past, provided read-out dials or gauges which merely indicate the existence of either of two conditions; that is, that the oil pressure is sufficient or that the oil pressure is not sufficient. More often than not, such read-out gauges are merely lamp assemblies, mounted as on the vehicular dash panel, which do not become energized when the oil pressure is or exceeds a predetermined minimum value but which do become energized when the oil pressure is less than such predetermined value.

Unfortunately, the provision of an oil pressure signal to the vehicle operator does not, in and of itself, inform the vehicle operator as to whether the reservoir of engine oil has become sufficiently depleted as to require the supplying thereto of an additional quantity of oil. Generally, it is deleterious to the engine to have the engine operate with a diminished or low oil supply. Among other things, in such a situation, there is a tendency for the oil temperature and engine temperature to increase sometimes to magnitudes causing irreversible harm to the engine.

Heretofore, in order to determine whether additional oil had to be supplied to the engine, the vehicle operator would have to park the vehicle and after opening the engine compartment hood reach in and extract the crankcase (oil reservoir) dip stick. Obviously when this occurred in the night, the darkness hindered an accurate reading of the existing oil level. Further, when the oil was relatively clean, it became difficult, because of lack of color contrast, to determine the exact mark left on the oil dip stick to, in turn, determine what the actual oil level was. Also, such prior art means of checking the oil level had to be performed under both hot and cold conditions depending on whether it was summer or winter. In any event, whenever the oil level was thusly checked, the operator often found that the oil level was already reduced to a level which could have been damaging to the engine even though the pressure gauge still indicated sufficient pressure.

Accordingly, the invention as herein disclosed and described is primarily directed to the solution of the above as well as any other fluid level measuring applications.

SUMMARY OF THE INVENTION

According to the invention, a liquid level indicator comprises conduit means having at least first and second open ends, said first open end being adapted to be placed into a related liquid contained within a related liquid reservoir, said first open end being positioned at a first predetermined elevation relative to said liquid, movable wall means having a first normal position, a second actuated position and a third indicating position, additional means urging said wall means to said first normal position, said wall means being effective when moved from said first position to said second position to displace a corresponding volume of pneumatic fluid from said conduit means, said third indicating position being attained by said wall means being urged and moved by said additional means from said second actuated position toward said first normal position and a portion of said liquid flowing upwardly into said conduit means.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted:

FIG. 1 is a side elevational view of an internal combustion engine and a fragmentary portion of the associated vehicle with the invention applied thereto;

FIG. 2 is an enlarged cross-sectional view of the invention shown in FIG. 1, taken generally along the longitudinal axis thereof, as well as a cross-sectional view of a portion of the engine crankcase or oil reservoir of the engine shown in FIG. 1;

FIG. 3 is an axial cross-sectional view of a modified form of the invention;

FIG. 4 is a view similar to FIG. 2 but illustrating in enlarged scale another embodiment of the invention; and FIG. 5 is a view taken generally on the plane of line 5—5 of FIG. 4 and looking in the direction of the arrows.

DETAILED DESCRIPTION OF THE PREFERRED EMBODIMENTS

Referring now in greater detail to the drawings, FIG. 1 illustrates, in side elevation, an internal combustion engine 10 having an engine block assembly 12 with a fuel-air induction or supply system 14, an output power-train transmission assembly 16, a lower mounted crankcase or oil pan housing 18, and a related tube structure 20, for slidably housing the prior art oil dip stick, leading to the oil reservoir internally of the oil pan or housing 18. Often the tube 20 is arranged as to pass through a portion of the engine block assembly 12 and thereby form a conduit communicating with the interior of oil pan 18. Usually, the dip stick is removably situtated within the tube 20 as to extend downwardly into the actual oil within the oil reservoir. A cover member carries by the dip stick serves to cover or close the otherwise open end of the tube 20 whenever the dip stick is fully inserted into the tube 20.

FIG. 1 also illustrates a fragmentary portion of a dash or instrument panel 22 situated as within the passenger compartment of the associated vehicle. As generally depicted, a plunger and housing assembly 24 may be carried by and secured to the panel 22. Suitable interconnecting conduit means 26 leads generally from the housing assembly 24 to the oil tube 20.

In FIG. 2, the assembly 24 is illustrated as comprising housing means 28 having a first housing section 30 and a second housing section 32 with such housing sections being retained to each other as by respective outer and inner threaded portions 34 and 36. Preferably, an annular seal 38 is provided generally between juxtaposed surfaces of housing sections 30 and 32 in order to prevent any leakage therebetween. The other end of housing section 30 may be provided with a portion 40 of generally reduced size which is externally threaded as at 42 whereby, after portion 40 is inserted through an aperture 44 in panel 22, a cooperating internally threaded nut 46 may be employed to secure housing means 28 to panel 22.

Housing body section 30 has an internally formed cylindrical passage or chamber 48 which terminates at its left end in a radially directed annular end surface 50 and which, in effect, terminates at its right end in radially directed annular end surface 52 of housing section 32. A piston 54, slidably received in cylinder or chamber 48, carries a stem 56 which is either secured to or integrally formed with piston 54. As shown, the stem 56 freely extends through a clearance passageway 58 formed axially in chamber 48 and through the left end of the housing means 28. In the preferred embodiment, a groove 60, formed in the outer cylindrical surface of piston 54, accepts an annular O-ring-like seal 62 which serves to minimize, if not totally eliminate, any possible leakage axially across the piston 54. A coiled compression spring 64, situated generally in chamber or passage 48, has its right end functionally engaging the surface 52 while its left end is in operative engagement with the axially movable piston or wall means 54.

Housing section 32 is provided with an extension-like connector portion 66 which may have a series of externally formed annular steps or grooves 68 adapted to receive and retain thereabout an end 70 of an associated flexible hose or conduit means 72 the other end 74 of which is similarly sealingly received about the upper end 76 of cooperating tube means 78 which, even though it may be formed by any suitable material, is preferably formed of plastic material such as, for example, nylon, as to have resistance to deterioration from high temperatures and/or corrosive characteristics of the liquid to be gauged.

Extension 66 has a passage or conduit means 80 formed therethrough as to communicate between chamber or passage means 48 and the passage means 82 defined internally of the hose 72. As is clearly shown, the passage means 82, in turn, communicates with the passage means 84 defined internally of conduit or tube means 78. A suitable cap member 86, carrying the tube member 78, is operatively connected to and atop of, for example, the usual dip stick tube 20 of the engine assembly 10. Tube member 78 is so positioned and carried by cap or collar 86 as to have its lower end 88 at a preselected relative elevation when the collar 86 is properly seated or operatively connected to the dip stick tube 20.

For purposes of description, let it be assumed that the normal or full level of oil 19 within the reservoir or crankcase housing 18 is depicted by the line 90 while a second preselected lower level of such oil is depicted by the line 92. Further, let it be assumed that such preselected level 92 corresponds to a condition within the oil reservoir or crankcase requiring the addition thereto of, for example, a quart of oil.

If it is now assumed that the level of the oil or liquid 19 within reservoir or housing 18 is at the full level, depicted by line 90, and the vehicle operator depresses stem 56 and piston 54 to a maximum distance (as generally depicted by end 57' of stem 56 shown in phantom line), against the resilient resistance of spring means 64, air will be displaced from chamber or passage means 48 with such displacement being generally equal to the effective area of piston or wall means 54 multiplied by the distance of axial travel of such piston means 54.

When the stem 56 and piston 54 have been thusly moved a maximum distance to the right and then, subsequently, released by the operator, spring 64 will start to move stem and piston 54 towards the left and in so doing a partial vacuum or a reduction in absolute pressure is created within chamber or passage means 48 to the right of piston 54 as well as in conduit or passage means 82 and 84. It should be remembered that prior to the operator depressing stem and piston or plunger means 54 the level of liquid or oil within conduit or passage means 84 was the same as that indicated by line or level 90. Therefore, as piston 54 and stem 56 start to move to the left under the action of spring means 64 a pressure differential exists across the liquid or oil within such conduit or passage 84. That is, if $P_a$ is considered to be ambient atmospheric pressure and $P_1$ is considered to be some lesser pressure (resulting from the leftward movement of piston means 54) within chamber 48 and conduit means 82, 84, it can be seen that a pressure differential $\Delta P$ will exist which (neglecting actual pressure within the crankcase) may be represented as:

$$\Delta P = P_a - P_1$$

Consequently, as piston or wall means 54 thusly moves to the left, $\Delta P$ causes the liquid or oil 19 to rise in conduit or passage 84 as to ultimately attain a height depicted by dimension D. Spring 64 is preferably selected as to have a spring force as low as possible but which will be sufficient to draw oil to the height, D, which may be 12 to 20 inches of oil. However, the force of spring 64 should not be so great as to draw oil into, for example, conduit 80 or chamber 48. Such dimension D, of course, is determined by and attained when the pressure head of the liquid or oil within conduit 84 and the magnitude of the pressure differential $\Delta P$ produced by the spring force, less frictional forces, are in equilibrium. When such equilibrium is attained, piston 54 ceases further movement, to the left, through the action of spring means 64.

For purposes of illustration, let it be assumed that when such movement to the left ceases, piston 54 is at a relative axial position depicted generally in phantom lines at 54'' and that the end of stem 56 assumes a corresponding position as at 57'' also shown in phantom line. If this occurs, after the operator has depressed and released the plunger means 54, the operator will then know that since the stem 56 has not returned to its original position (as shown by end 57 in solid line) the level of the oil or liquid 19 has not become reduced to the point where additional oil or liquid 19 has to be supplied to reservoir 18. Although not essential, additional means may be provided to enable the operator to more quickly ascertain the degree to which such plunger means 54 has moved to the left. For example, if desired, an annular groove 94 would be formed externally in stem 56 so that if groove 94 was not visible after depressing and releasing the plunger means 54, the operator would immediately know that the plunger means 54 has not returned to its original position.

If it is assumed that the level of the liquid 19 has dropped to that illustrated generally at 92 so as to have end 88 of tube member 78 no longer submerged within the liquid, it can be seen that when the operator depresses and then releases the piston means 54, no pressure differential will thereby be created across any portion of liquid 19 and piston 54 and stem 56 will be returned, by the action of spring 64, to their original position shown in solid line thereby indicating to the operator that the liquid 19 is at or even below the level at which an additional quantity of oil or other liquid should be supplied to the reservoir 18.

Further, it is contemplated that an aperture or passageway 98 may be formed through the wall of housing means 28 as to be in communication with the ambient atmosphere. The relative location of such aperture means 98, axially of the chamber 48, is so selected as to place the inner open end of passage 98 close to sealing means 62 when piston means 54 ceases its leftward movement and stops at the position depicted in phantom line at 54''. Ideally, air passing through the clearance of passage 58 will slowly leak past sealing means 62 thereby enabling the piston to slowly move further to the left until port 98 becomes uncovered thereby. Once port 98 thusly becomes uncovered, air flows relatively rapidly through port 98 and into chamber 48, conduit 80, and conduits 82, 84 thereby enabling the quick and full return to the piston 54 and stem 56 to their original position as well as to permit the oil within conduit 84 (at the height of dimension D) to drain back into the reservoir 18 at which time the invention is ready for its next check to the oil level.

FIG. 3 illustrates a modification of the invention. All elements which are like or similar to those of FIG. 2 are identified with like reference numbers provided with a suffix a. The hose 72, tube member 78, oil filler tube 20 and reservoir 18 are not again shown in FIG. 3 as it is to be understood that such cooperate with the structure of FIG. 3 in the manner already disclosed with reference to FIG. 2 and FIG. 1.

Referring now in greater detail to FIG. 3, additional valved passage means 100 is provided, as by being formed in housing means 28a, in a manner as to define a valve seat 102 against which a valving member 104, contained in passage 100, is resiliently held in a closed condition as by a preloaded compression spring 106 seated at one end against valve member 104 and seated at its other end as against, for example, a plug member 108 sealingly seated and received within passage 100. Valve member 104 carries with it an extension portion 110 which extends through a comparatively enlarge clearance passage 112 formed in housing means 28a. An orifice or port 114 serves to complete communication as between passage 100 and chamber 48a.

The structure disclosed with reference to FIG. 3 is employed as a safety or testing indicator. That is, if it is assumed that the operator has fully depressed plunger means 54a and has also released it, and if it is also assumed that the piston 54a, through the action of spring 64a, has returned and stopped at the position shown and not fully returned to its left-most position, the operator would logically assume that such stopping of the piston indicated an adequate oil level. However, if for some reason, other than the existence of an adequate liquid or oil level, the piston 54a became stopped in such a position, the operator's logical assumption would fact be an incorrect conclusion.

For example, let it be assumed that the level of liquid 19 is actually below that of level 92 and that piston 54a, while traveling to the left under the action of spring 64a, stopped at the position illustrated which corresponds to a position indicating the presence of an adequate supply or level of oil. Let it further be assumed that the stopping of the piston 54a at such position was actually brought about mechanically as by, for example, a particle of dirt or some foreign matter lodged as between the piston 54a or stem 56a and the housing means 28a.

With the modification of the invention of FIG. 3, it becomes a simple matter for the operator to discern whether his assumption, that the piston position indicates an adequate oil level, is correct. That is, if the released piston 54a stops in the position generally depicted, all the operator has to do is to then axially depress valve extension 110 thereby moving valve 104, against the resilient resistance of spring 106, off the coacting seat 102. Consequently, ambient atmospheric pressure is transmitted through clearance passage 112, into chamber or passage 100 and through port 114 into chamber 48a and conduit means 80a.

If upon such admission of ambient atmospheric pressure piston 54a fails to move further to the left, the operator then knows that what had caused piston 54a to stop in such position was not the existence of a partial vacuum and that, in fact, no such partial vacuum even existed in chamber 48a and conduit means 80a. Consequently, since such partial vacuum did not exist, an adequate supply of liquid or oil did not exist in the reservoir 18 at time of testing and the stopping of the full return of piston 54a was caused by some mechanical interference or even a failure within a related component or components of the invention.

In any event, it can be seen that the provision of such actuatable venting means is disclosed in FIG. 3 enables the operator to verify that the reading which was obtained, when the liquid level is checked, was correct.

FIG. 4 illustrates another embodiment of the invention as comprising a housing assembly 120 comprising a first housing section 122 and a second housing section or end member 124. A cylindrical chamber 126 formed within housing section 122 has its otherwise open end closed by disc-like end member 124 which may be assembled to the housing section 122 as by having its outer periphery 128 press-fit within opening 130 and, if desired, cemented therein. The inner side of end member 124 has an annular extension 132 carried thereon and, when viewed in axial cross section, such annular extension 132 has, as its radially outer surface, a continuous ramp-like surface 134 the function of which will be made more apparent as the description proceeds.

A piston assembly 136, slidably received in chamber or cylinder 126, is illustrated as comprising a piston head portion 138 formed integrally with a stem-like extension 140 with such extension being preferably hollow to form a cavity 142. The extension 140 freely passes through a clearance aperture or passageway 144 formed in and through end member 124. A cylindrical pilot-like surface 146 formed on the stem or extension 140 receives thereabout a cup-like flexible seal 148 which, although capable of being constructed of various suitable materials, is preferably formed of leather with a suitable lubricant, such as oil, impregnated therein. An annular seal retainer plate 150 is assembled onto stem 140 and against seal 148 preferably by having the inner diameter 152 thereof press-fitted onto shoulder or pilot surface 146 and, if desired, cemented thereto.

The end wall 154 of housing section 122 has an annular inwardly directed extension 156 while the inner end surface of piston head portion 138 has a similarly inwardly directed second annular extension 158. Such extensions 156 and 158 serve as spring guides or pilots for maintaining a compression spring 160 therebetween.

Although not necessary to the practice of the invention, the end of the cavity 142 may be suitably closed as by plug means 162 and the cavity 142 filled with a suitable lubricant such as, for example, oil. Further, generally radially directed passages or conduit means 164 may be formed as to have registry with the seal 148 and as to communicate with cavity 142 thereby being able to continuously provide, as needed, lubricant from cavity 142 to the seal 148 thereby assuring a greatly extended seal life.

The housing assembly 120 may have integrally formed therewith a second passage or opening 166 which, in turn, may receive one end of a generally tubular adapter or connector 168. Preferably, connector 168 is secured as by having its cylindrical outer surface 170 press-fitted into opening 166 and, if desired, cemented therein. A generally radially directed passage or conduit 172, formed through a wall portion of housing section 122, serves to complete communication between chamber 126 and passage 166.

Further, in the preferred form of the embodiment of FIG. 4, housing section 122 has a passageway 174 formed therein as to communicate at its right end with passage or conduit 166. The left end is formed with a valve seat portion 176 generally circumscribing a clearance passageway 178 which, at times, serves to complete communication as between the ambient atmosphere and passageway 174.

A valve member 180, generally slidably received within passage 174, has, at its right end, a head-like portion 182 which may, in turn, have formed therein a plurality of slots, grooves or relieved portions 184 as to enhance unrestricted flow through passage 174 and past head portion 182. The left end of valve member 180 carries a valving surface 186, adapted for cooperation with valve seat 176, and an axial extension or stem 188 which freely extends through passage 178 as to provide for free clearance radially between extension 188 and passage 178. A spring 190 contained generally in passage 174 serves to continually resiliently urge valve member 180 to the left as to seat valving surface 186 against valve seat 176 and thereby terminate communication as between passage 178 and passage 174.

Also, in the preferred embodiment of the invention of FIG. 4, an atmospheric vent passage 179 is formed through a wall of housing section 122 as to communicate between the chamber 126 and the ambient atmosphere in the same manner and the same purpose as vent 98 of FIG. 2.

The tube 78 (also shown in FIG. 2) is illustrated as passing through a clamping-type cover member 192 and extending upwardly therefrom as to be operatively connected as to a flexible conduit member 194 as by means of a tubular coupling member 196. Cover 192 has an enlarged body 198 with a downwardly depending cylindrical extension 200, preferably formed integrally therewith, which is adapted for reception within, for example, the oil dip stick tube 20. A passageway 202, formed through body 198 and extension 200, serves to receive said tube 78 therethrough. As shown in both FIGS. 4 and 5, body 198 has a generally axially extending slot 204 formed therein as well as a clearance passageway 206 formed generally transversely to such slot 204. As shown in FIG. 5, a screw or bolt 208 with its shank 210 extending through passageway 206 is employed for compressing the body 198 sufficiently to hold the tube 78 in any selected adjusted position relative to the level of the fluid to be gauged.

The operation of the invention as disclosed in FIGS. 4 and 5 is like that as disclosed and described with reference to FIGS. 2 and 3. That is, generally, as end 141 of stem 140 is depressed as to the position shown in phantom line at 141' piston head 138 will be moved as to a position generally fragmentarily depicted in phantom line at 138' thereby displacing the air within chamber 126 and causing such air to flow out through passage 172, conduit portions 166, 171, conduit means 194 and tube 78. After so depressing stem 140, and upon its subsequent release, spring 160 causes leftward movement of piston assembly 136 with the resulting pressure differentials as previously discussed. Valve member 180, of course, functionally corresponds to valve 104 of FIG. 3.

It should be noted that the arrangement of FIG. 4 provides additional benefits as an operating structure. That is, for example, the provision of the annnular or conical ramplike surface 134 enables such surface 134 to function as a cam means to engage the cylindrical or side wall 135 of the seal 148 and urge such cup wall radially outwardly whenever the piston assembly 136 has been moved to the position illustrated. By such cam or ramp action, the cup side wall 136 is continually kept circular and fully expanded radially outwardly against the cylindrical surface of chamber 126. This, again, greatly extends the useful like of the seal 148.

Although the practice of the invention is not so limited, it has, nevertheless, been discovered that enhanced operating characteristics are obtained when the chamber 126 is formed as to have a slight taper to it. That is, in one particular successful embodiment of the invention of FIG. 4, where the axial length of the chamber 126 was in the order of 1.50 inches and where the diameter, as at A, at one end of the chamber 126 was in the order of 0.990 inches, that a taper in such diameter to the other end of chamber 126, as represented by diameter B, to a dimension of 0.980 inches brought about marked improvement in operating characteristics. (It should, of course, be apparent that the actual dimensions herein presented are by way of illustration and not necessary of limitation.) Generally, by the above, it has been discovered that by making the diameter of the chamber 126 tapered as to be relatively smaller at the end to where the piston assembly 136 is depressed results in the assurance that the sealing means 148 will properly seal, as along its portion 135, against the surface of chamber 126 when the piston assembly 136 is fully depressed as to its position at 138'. (This becomes especially significant when such tapered chamber is employed in an arrangement which also employs, at the larger end, the cam or ramp means 134 urging the cup seal side wall 135 outwardly against a larger diameter.) Further, while sealing is assured at one end, additional benefits are attained, because of such a taper, as the piston assembly 136 moves to the left under the action of spring 160. Obviously, the further to the left that piston assembly 136 is moved by the spring 160, the lesser becomes the force of such spring 160. However, because of the taper in the chamber 126, as the force of spring 160 diminishes so does the frictional resistance of seal 148 because of the expanding or increasing diameter of chamber 126.

In the preferred embodiment of the invention as shown in FIG. 4, the upper portion of the housing section 122 is provided with integrally formed laterally extending and oppositely disposed flange portions 220 and 222 which cooperate to define an upper mounting surface 224 for, in turn, mounting the housing assembly to related support structure. It is further contemplated that such mounting surface 224 may be employed for carrying thereon, for example, a strip of double-sided adhesive material thereby enabling the quick and easy detachable attachment of the housing assembly 120 to any desired support structure.

Although many different materials are, of course, acceptable in the construction of the housing assembly 120, piston assembly 136, and valve member 180, as indicated by the drawings in the preferred embodiment of the invention of FIG. 4, such components are made of plastic.

Although only one preferred embodiment and selected modifications of the invention have been disclosed and described, it is apparent that other embodiments and modifications of the invention are possible within the scope of the appended claims.

I claim:

1. Liquid level gauging apparatus for gauging the level of a liquid within a related reservoir, comprising conduit means, said conduit means comprising first and second ends, said first end being adapted for insertion within said liquid to a first selected relatively low elevation, movable wall means generally closing said second end, and resilient means normally operatively engaging said movable wall means and urging said movable wall means in a direction generally away from said first end and toward a first normal position, said movable wall means being adapted for movement generally towards said first end and to a second position against the said urging of said resilient means whenever said level of said liquid is to be gauged, and said resilient means being effective to move said movable wall means from said second position to a third position generally between said first and second positions whenever said level of said liquid is elevationally above said first selected relatively low elevation, a portion of said liquid within said reservoir being drawn upwardly through said first end and into said conduit means a distance above said selected relatively low elevation in order to maintain said movable wall means in said third position.

2. Liquid level gauging apparatus according to claim 1 and further comprising venting means for at times venting ambient pressure to said conduit means generally between said movable wall means and said first end and to thereby permit said portion of said liquid in said conduit means above said selected relatively low elevation to flow downwardly to said selected relatively low elevation.

3. Liquid level gauging apparatus according to claim 2 wherein said venting means comprises normally closed valving means separate from said movable wall means and separately manually actuatable to an open position.

4. Liquid level gauging apparatus according to claim 2 wherein said venting means comprises second and third conduit means communicating with each other and with said first mentioned conduit means, passage means for completing communication between said second conduit means and a source of ambient pressure, valve means carried within said second conduit means adapted to at times cooperate with a valve seat to thereby prevent said communication between said second conduit means and said source, and resilient means carried within said second conduit means for normally urging said valve means into seated relationship with said valve seat.

5. Liquid level gauging apparatus according to claim 1 wherein said movable wall means comprises piston means.

6. Liquid level gauging apparatus according to claim 5 wherein said piston means comprises a piston head portion, annular sealing means carried by said piston head portion and movable therewith, and a stem portion carried by said piston head portion for actuating said piston head from said first normal position to said second position.

7. Liquid level gauging apparatus according to claim 6 wherein said annular sealing means comprises a generally cup-shaped seal.

8. Liquid level gauging apparatus according to claim 1 wherein said conduit means comprises tube means insertable in said liquid, housing means in communication with said tube means, wherein said housing means comprises a chamber formed therein with said communication being established with said chamber, wherein said movable wall means is situated within said chamber, and wherein said resilient means comprises spring means carried within said chamber.

9. Liquid level gauging apparatus according to claim 1 wherein said conduit means comprises tube means insertable in said liquid, housing means in communication with said tube means, wherein said housing means comprises a chamber formed therein with said communication being established with said chamber, wherein said movable wall means comprises piston means situated in said chamber, wherein said resilient means comprises spring means carried within said chamber, and further comprising an output member carried by said piston means as to extend beyond said housing means, said output member serving as an indicium of the axial position of said piston means relative to said chamber.

10. Liquid level gauging apparatus according to claim 9 and further comprising venting means formed in said housing means as to at times communicate ambient pressure to said chamber.

11. Liquid level gauging apparatus according to claim 9 wherein said liquid comprises oil, wherein said reservoir comprises the crankcase of an associated engine, and wherein said housing means is situated generally in the passenger compartment of an associated vehicle employing said associated engine as to be remotely situated with respect to said reservoir.

12. Liquid level gauging apparatus according to claim 1 wherein said conduit means comprises tube means insertable in said liquid, housing means in communication with said tube means, wherein said housing means comprises a generally cylindrical chamber formed therein with said communication being established with said chamber, wherein said movable wall means comprises piston means situated within said chamber, said piston means comprising a piston head portion, a stem portion carried by said piston head portion axially extending therefrom and through a first axial end wall of said chamber, an annular cup-like seal situated generally about said stem and operatively against said piston head portion, seal retainer means situated generally about said stem portion and retaining said seal generally between said retainer means and said piston head portion, said cup-like seal comprising an annular axially extending wall for engaging the cylindrical wall of said cylindrical chamber, and wherein said resilient means comprises spring means carried within said chamber.

13. Liquid level gauging apparatus according to claim 12 wherein said cup-like seal is comprised of fibrous material and impregnated with a lubricant.

14. Liquid level gauging apparatus according to claim 12 wherein said cup-like seal is comprised of fibrous material, wherein said stem portion has a second chamber formed therein for the carrying of a lubricant therein, and further comprising passage means formed in said stem portion and communicating with said second chamber and in registry with said cup-like seal, said passage means in registry with said cup-like seal being effective to transmit said lubricant as is carried within said second chamber to said cup-like seal.

15. Liquid level gauging apparatus according to claim 12 wherein said first axial end wall is provided with generally axially directed cam means effective for engaging said annular axially extending wall of said cup-like seal whenever said piston means is in said first normal position as to thereby urge said annular axially extending wall radially outwardly against said cylindrical wall of said cylindrical chamber.

16. Liquid level gauging apparatus according to claim 12 wherein the diametral dimension of said cylindrical chamber progressively increases in magnitude from one effective axial end of said cylindrical chamber to an other effective axial end of said cylindrical chamber as to result in the diametral dimension of said cylindrical chamber at said first axial end wall being comparatively the larger, and wherein said annular axially extending wall of said cup-like seal is effective for maintaining sealing engagement with said cylindrical chamber throughout the travel therein of said piston means.

* * * * *